No. 639,905. Patented Dec. 26, 1899.
J. POST.
ELECTRIC BATTERY.
(Application filed July 14, 1899.)
(No Model.)
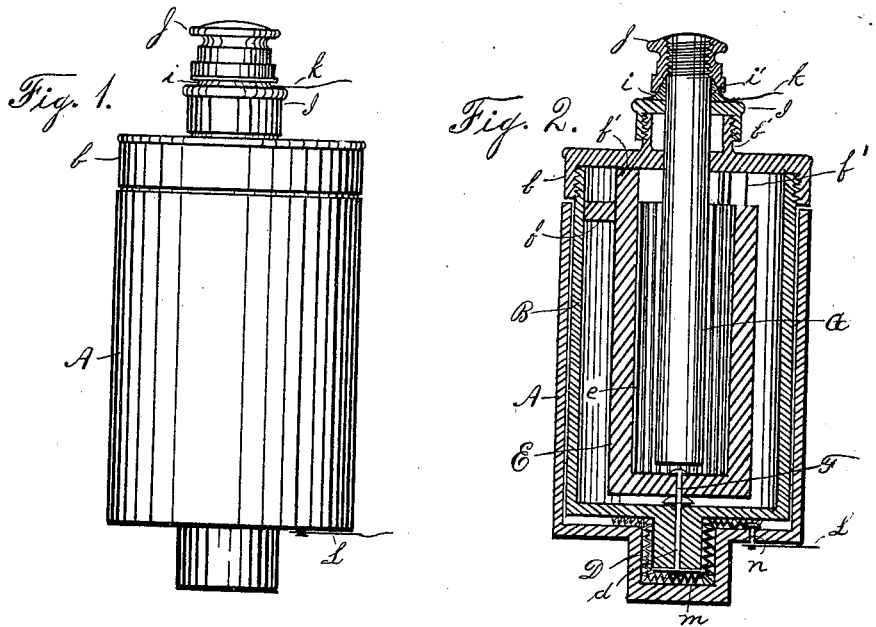
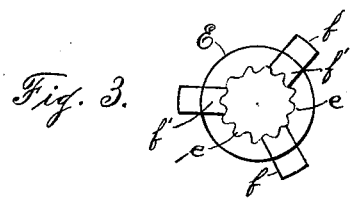
WITNESSES:
H. A. Daniels
G. B. Towles
INVENTOR
John Post.
BY Chas. D. Smett
ATTORNEY

United States Patent Office.

JOHN POST, OF NEW YORK, N. Y.

ELECTRIC BATTERY.

SPECIFICATION forming part of Letters Patent No. 639,905, dated December 26, 1899.

Application filed July 14, 1899. Serial No. 723,810. (No model.)

*To all whom it may concern:*

Be it known that I, JOHN POST, a citizen of the United States, residing at New York, in the county of New York and State of New York, have invented certain new and useful Improvements in Electrical Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to chemical electric batteries, and has especial reference to the construction of the casing and cells. The casing is made water-tight, and the battery is adapted to energize stationary, vehicle, and hand lamps, to propel vehicles and actuate machinery, and for other purposes to which electricity is applied.

The accompanying drawings illustrate the invention, in which—

Figure 1 is a side elevation, and Fig. 2 is a vertical section, thereof. Fig. 3 is a plan of the carbon plate, and Fig. 4 is a plan of a sleeve.

Like letters denote corresponding parts in the several views.

A indicates a socket to hold the cells in position when the batteries are attached to a vehicle.

B is the casing, preferably made cylindrical and of hard rubber or other material impervious to water. It is here shown to be cylindriform. It is provided with a water-tight cover $b$, preferably screwed thereon. Its bottom has a central exterior extension D, which is centrally perforated to receive a conductor $d$, the latter being electrically connected to conductor L by the conductors $m$ and $n$.

E is the carbon electrode, which I prefer to make cylindriform and with interior corrugations $e\ e$ to secure a large surface exposure to the excitant. It is provided with a bottom conductor F to contact with conductor $d$, above mentioned, and with shoulders $ff$ for support against the interior sides of the casing B and with vertical projections $f'\ f'$ to contact with the screw-cover $b$. The plate is thus held rigid by its top, bottom, and lateral supports.

The cover $b$ has a central perforation to admit the zinc bar G. The cover $b$ has a vertical threaded annular flange $b'$. A threaded cap I is screwed upon this flange and is centrally perforated to movably admit the zinc bar G. It also carries a conducting-sleeve $i$, which surrounds and contacts with the zinc bar. This cap I has a vertical annular flange $i'$. The top J is fixed upon the bar G and is fitted frictionally upon the flange of cap I, and by it the bar is drawn up through the cap I and cover $b$. The shield $i$ projects laterally beyond the top J for connection with a conductor $k$.

When a supply of an excitant, as sulfuric acid, is in the cell, the current is made by pushing the zinc bar down into the liquid and is broken by drawing up the bar out of the liquid.

What I claim and desire to secure is—

1. A battery comprising a water-tight casing having a perforated cover to admit a zinc bar, whose bottom is perforated and receives a conductor, a vertical, annular, threaded flange on said cover, a threaded cap to screw upon said flange, a conducting-sleeve on said cap contacting with the zinc bar, a top on said bar frictionally fitted upon said sleeve, a carbon plate having lateral shoulders and a bottom conductor in contact with the conductor in the bottom of the casing, as described.

2. A battery comprising a socket A, water-tight casing B, having a cover $b$, a centrally-perforated bottom extension D, with conductor $d$, therein, exterior conductors contacting with conductor $d$ through the socket A, a tubular carbon electrode in the casing having top and lateral bearing projections and a bottom conductor contacting with the conductor in the bottom of the casing, a zinc electrode rigidly suspended from the cover $b$, and contacting with a sleeve $i$, and a cap I, over said sleeve substantially as herein set forth.

In testimony whereof I affix my signature in presence of two witnesses.

JOHN POST.

Witnesses:
 EDWARD S. SAVAGE,
 M. WALTER PRATT.